Patented Mar. 13, 1934

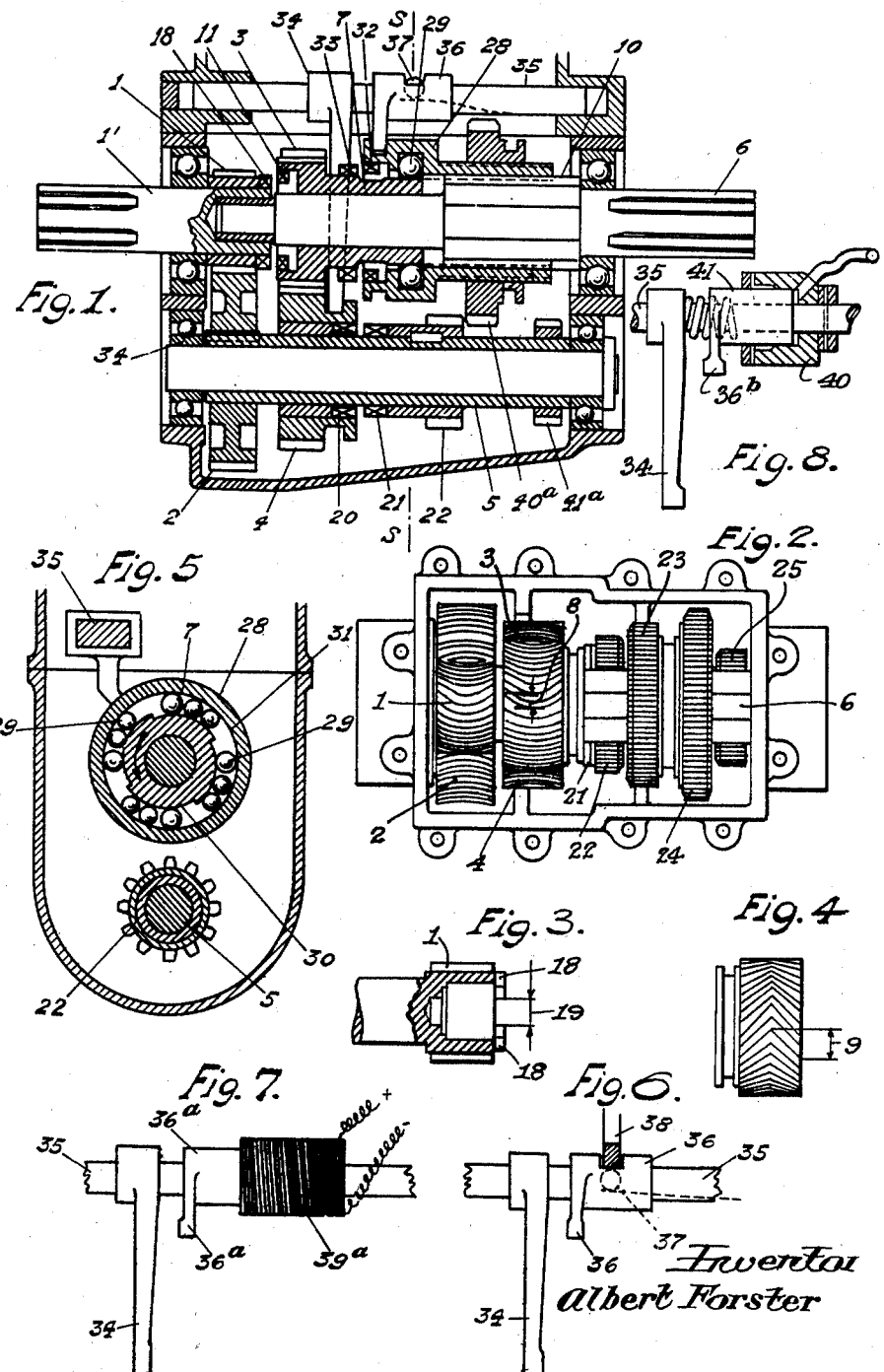

1,950,844

UNITED STATES PATENT OFFICE 1,950,844

CHANGE SPEED GEAR

Albert Forster, Milanino, near Milan, Italy

Application February 24, 1932, Serial No. 594,782
In Switzerland February 27, 1931

12 Claims. (Cl. 74—57)

The present invention relates to a change speed gear having at least two pairs of continuously interengaging toothed wheels of which at least one is formed of two toothed wheels of which one, when moved axially on its shaft, moves the other therewith in an axial direction on the shaft of this wheel.

In this change speed gear with a pair of trailing wheels at least one of the trailing wheels loosely mounted on the driven shaft is rotatably connected in an automatically releasable manner to the driven shaft by a overrunning clutch, known per se, whereby the driven shaft can turn with a free wheel movement relatively to the trailing wheel and in the same direction of rotation. By the controlled axial movement of a clutch sleeve dogs are caused to interengage so as to produce a rigid rotary coupling of the trailing wheel with the driven shaft which simultaneously disengages the automatic overrunning clutch and thus the free wheel movement of the driven shaft.

The subject of the invention permits of an engagement and disengagement of the free wheel movement at suitable axial positions of the trailing wheel by means of a movement of the clutch sleeve relatively to a clutch member which is controlled mechanically, electrically, pneumatically or hydraulically.

The subject of the invention is particularly applicable to power vehicles wherein within recent times change speed gears with more than one pair of constantly interengaging toothed wheels have been used for the purpose of obtaining noiseless operation of the driving shaft at at least two speed stages. In these known gears the constantly interengaging pairs of toothed wheels are mounted on the gear shaft in a manner so as to be immovable axially and are rotatably connected to the gear shafts when required by separate clutches, which in themselves are axially movable on the gear shafts, or by means of friction clutches. The presence of these clutches, however, in contrast to the previously used change speed gears having movable wheels and at the most one pair of toothed wheels in constant engagement, necessitates increased lengths of shafts which produce increased natural oscillations, these in turn influencing the noiselessness. The object of the present invention is to eliminate these and other disadvantages of known change speed gears.

Change speed gears are known with constantly interengaging pairs of toothed wheels, which drive one another along their shafts because of the shape of their teeth, which are of the herring-bone type. Such gears are of greater length than ordinary spur gears, and therefore require a more exact centering on their shafts, in order to interchange efficiently. However, an exact centering cannot be carried out if the gears, or one thereof, are slidable on splined shafts, as is the case with all of the known arrangements, for the surfaces which slide upon one another may not be circularly ground or machined with sufficient precision. For this reason the known gears with wheels which drive one another axially do not work satisfactorily.

According to the present invention this inconvenience may be avoided by providing both on shaft and wheel circularly ground surfaces, adapted to bear against one another, so that a wheel is perfectly centered on its shaft and may with precision slide along the same. The interengaging wheels are both mounted slidably on their shafts and are fitted with teeth having, when developed in a plane, a rather strong curvature. Such wheels meshing together are hereafter called trailing wheels. The rotary connection between shaft and wheel is effected either through joints or clutches. In an improved embodiment a clutch element engaging with a wheel is extended at one side and formed as a race way of a free wheel device, adapted to operatively connect the said clutch element with the shaft only in one direction of motion.

Two examples of construction of the invention are illustrated in the accompanying drawing wherein:—

Fig. 1 is a longitudinal section of a change speed gear constructed and arranged according to one embodiment of my invention.

Fig. 2 is a plan view of a change speed gear according to the invention.

Fig. 3 is a detail axial section of a trailing wheel.

Fig. 4 is a plan of another example of a trailing wheel.

Fig. 5 is a normal section on the line S—S of Fig. 1.

Fig. 6 is a detail elevation partly in section, of an example of construction of control means for the clutch sleeve.

Fig. 7 is a detail elevation of a further example of construction of the electrical control of the clutch sleeve.

Fig. 8 is a similar view of a further example of construction of a control of the clutch sleeve by pneumatic hydraulic means.

The driving toothed wheel 1, keyed to the engine or driving shaft 1', is in constant engagement with the toothed wheel 2, immovably mounted on the secondary shaft 5, and the axially movable toothed wheel 4, loosely mounted on the secondary shaft 5, is in constant engagement with the toothed wheel 3 which is axially movable on the driven shaft 6 and is rotatable thereon together with the clutch element 7 with which said wheel 3 is integral. The toothed wheels 1, 2, 3, 4 form the two pairs of constantly interengaging toothed wheels. The teeth of the toothed wheel pair 3, 4 have in the plan in Fig. 2 a shape curved in the axial direction, these teeth having at the center line such a large total curvature 8 that an axial movement of the toothed wheel 4 relatively to the toothed wheel 3 and vice versa is impossible. The axial pressure components of the tooth pressure of the energy transmission cease in the interior of each of the toothed wheels 3 and 4. Since a relative movement of wheels 3 and 4 is prevented, it follows that any shifting of one of said wheels along its shaft results in a corresponding shifting of the other wheel along its shaft, so that one wheel is dragged or trailed by the other. The toothed wheel pair 3, 4 will therefore be referred to hereinafter as the trailing wheel pair and the toothed wheels 3 and 4 as trailing wheels.

Instead of the curved teeth the trailing wheels may also be provided with teeth in the form of arrow heads (Fig. 4), these teeth having such a length of arrow head 9 that axial movement of one of the trailing wheels 3 and 4 relatively to the other is rendered impossible.

Dogs 18 are provided on wheel 1 and present spaces 19 between which dogs 11 provided on wheel 3 may engage. Thus, by shifting wheel 3, a direct connection may be created between wheels 1 and 3, and therefore between shaft 1 and clutch element 7. Then, wheel 4 turns freely on shaft 5. The trailing wheel 4 is provided with dogs 20 adapted to engage with dogs 21 carried by a clutch element 22 keyed on the shaft 5.

The driven shaft 6 is provided with keyways 10 of the known shape usual in the sliding shafts of change speed gears in the power vehicle construction.

A clutch sleeve 28 which is slidable axially on the shaft 6 and is connected thereto by keys or splines which engage in the keyways 10 is hence also revoluble with said shaft. On the clutch element 7 are curved wedge surfaces 30 (Fig. 5). Said wedge surfaces press locking balls 29 against the inner surface 31 of the clutch sleeve 28 when the clutch element 7 turns in the direction indicated by the arrow in Fig. 5 relatively to the clutch sleeve 28 or they are released when the clutch element 7 lags behind the clutch sleeve 28 during its rotation. The inner surface 31 of the clutch sleeve 28 with the locking balls 29 and the wedge surfaces 30 form a known form of overrunning clutch by which the trailing wheel 3 or the clutch element 7 is connected in such manner that it can be disengaged automatically with the driven shaft 6. Hence the driven shaft 6 can have a free wheel movement relatively to the trailing wheel 3 and in the same direction of rotation.

The clutch sleeve 28 is also provided with dogs 32 which by controlled axial movement of such clutch sleeve toward the trailing wheel 3 can be brought into engagement with dogs 33 provided on the clutch element 7. By such means it is possible to provide a positive connection of the clutch element 7 and hence trailing wheel 3 with the clutch sleeve 28 and hence driven shaft 6, while simultaneously effecting a disengagement of the overrunning clutch or of the free wheel movement of driven shaft 6. By moving the clutch sleeve 28 in the opposite direction the dogs 32 and 33 are moved out of engagement with one another and the overrunning clutch or free wheel movement of the driven shaft 6 again comes into operation.

The guide fork 34 of the trailing wheel pair 3, 4 is rigidly connected to the operating rod 35 on which is slidably mounted the guide fork 36 of the clutch sleeve 28. A movement of the rod 35 therefore produces a movement of the trailing wheel pair 3, 4 on the driving and secondary shafts, but not necessarily also an axial movement of the clutch sleeve 28 relatively to the clutch element 7; or relatively to the trailing wheel 3. On the contrary such axial movement is controlled by relative movement of the guide fork 36 on the operating rod 35 which may be effected by mechanical, electrical, pneumatic, or hydraulic means.

In the example of construction according to Figs. 1 and 6 the relative axial movement of the guide fork 36 or of the clutch sleeve 28 is effected mechanically by means of the control lever 38 which presses a stop ball 37 and moves the guide fork 36 on the operating rod 35, whereby the setting in or out of operation of the free wheel movement desired by the driver is obtained. The control lever 38 may also be identical with the change lever of the change speed gear.

In the form of construction according to Fig. 7, the relative movement of the guide fork 36ª or of the clutch sleeve 28 is controlled electrically by opening or closing the circuit of a coil winding 39ª of which the iron core is formed by the hub of the guide fork 36ª or is positively connected thereto, while in the form of construction according to Fig. 8 this axial movement is controlled by the admission or exhaust of a pneumatic or hydraulic pressure medium, which by means of a cylinder 40 acts on the piston 41 formed by the hub of the guide fork 36ᵇ or is positively connected thereto.

The engagement and disengagement of the overrunning clutch and thus the free wheel movement may be effected by the above described axial movement of the guide fork 36 or clutch sleeve 28 relatively to the clutch element 7 in any suitable axial position of the trailing wheel 3 on the driven shaft 6 or of the trailing wheel pair 3, 4. If for example the trailing wheel 3, by engagement of the dogs 11 and 18 is rotatably connected with the driving wheel 1 and the clutch sleeve 28 has its dogs 32 disengaged from the dogs 33 of the clutch element 7 the rotary connection of the driving wheel 1 with the driven shaft 6 is produced by setting into operation the overrunning clutch or the free wheel movement. If now by closing the circuit of the coil 39 (Fig. 7) the iron core of the guide fork is pressed axially towards the guide fork 34 the axial movement of the clutch sleeve 28 (Fig. 5) immediately takes place, when a free wheel movement begins to take place, that is to say the locking balls are released from the locking position. At this moment however the speed of rotation of the clutch sleeve 28 relatively to the clutch element 7 is very small and the dogs 32 and 33 (Fig. 1) can be brought into engagement without difficulty, whereby the disengagement of the overrunning clutch or free wheel movement is completed in the position adopted by the trailing wheel pair or trailing wheel 3. When using the change speed gear in the power vehicle the production of free wheel movement is possible at any time by reducing the speed of rotation of the driving engine by means of the clutch lever or the gas lever when the vehicle by reason of its inertia retains its speed of movement and the driving shaft 6 its speed of rotation for a short time.

The axial position of the guide fork 36 on the operating rod 35 can be so adjusted that in the position of the trailing wheel pair 3, 4 shown in Fig. 1, in which there is no transmission of power from the driving wheel 1 to the driving shaft 6, the dogs 32, 33 are in relative engagement whereby at the moment of engaging the driving shaft in predetermined speed stages the overrunning clutch is disengaged.

Further speed stages of the driving shaft 6 can be obtained by means of the toothed wheel 40$^a$, mounted on the clutch sleeve 28 and rotating therewith, which in the known manner can be brought into engagement with a toothed portion of the clutch element 22 or the toothed portion of a reversing shaft which is driven by the toothed wheel 41$^a$.

What I claim is:—

1. In a change speed gear, the combination of a driving shaft, a lay shaft, a driven shaft, a pair of trailing wheels, adapted to shift one another in an axial direction, one of said wheels being rotatably and slidably mounted on said lay shaft and the other on said driven shaft, means arranged to operatively connect said trailing wheel mounted on said driven shaft with said driving shaft, means arranged to operatively connect each of said trailing wheels with its shaft, and a friction clutch, arranged to connect said trailing wheels with the driven shaft.

2. A change speed gear according to claim 1, said clutch being of the free wheeling type and located between one of said trailing wheels and its associated shaft.

3. A change speed gear according to claim 1 including means for moving said clutch into and out of its engaging position.

4. A change speed gear according to claim 1 including electrical means for moving said clutch into and out of its engaging position.

5. A change speed gear according to claim 1 including fluid-pressure actuated means for moving said clutch into and out of its engaging position.

6. A change speed gear according to claim 1 including hydraulic means for moving said clutch into and out of its engaging position.

7. A change speed gear according to claim 1 including a coil with a circuit, and a throttle lever, said throttle lever in one position serving to close said circuit whereby the coil is energized and actuates said clutch.

8. In a change speed gear, the combination of a driving shaft, a driven shaft, a lay shaft operatively connected with said driving shaft, a pair of toothed wheels loose on and slidable along said driven and lay shafts, and arranged to shift one another along their shafts by virtue of the shape of their teeth, a sleeve splined on said driven shaft, an overrunning clutch operatively connecting said sleeve and said toothed wheel slidable on said driven shaft, and means adapted to positively connect said sleeve and said wheel.

9. In a change speed gear, the combination of a driven shaft and a lay shaft, a trailing wheel loose on said driven shaft, another wheel on said lay shaft, the said wheels meshing with one another and shifting each other along their shafts, a sleeve slidable along and rotatably connected with said driven shaft, an overrunning clutch operatively connecting said first mentioned wheel and said sleeve, means arranged to render said clutch inoperative in a given relative axial position of the said wheel and sleeve, means arranged to shift the said wheel and sleeve together for effecting one drive ratio and means arranged to shift the said sleeve relatively to said wheel for rendering said clutch operative or idle.

10. A change speed gear according to claim 9, said overrunning clutch comprising a boss on said trailing wheel, said boss having wedge surfaces thereon, and balls between said sleeve and said wedge surfaces.

11. A change speed gear as claimed in claim 9, said shifting means comprising a shifting rod, a shifting fork fixed on said rod and arranged to operate said wheels, another shifting fork slidable on said rod and arranged to operate said sleeve, means arranged to fasten said second mentioned fork to said rod, and means arranged to shift the said second mentioned fork on the said rod.

12. A change speed gear comprising in combination a driving shaft, a driven shaft, a lay shaft operatively connected with said driving shaft, a pair of wheels loose on and slidable along said driven and said lay shafts, said wheels being provided with teeth having a longitudinal curvature and adapted to mesh with each other and drive and shift one another, means adapted to operatively connect said wheels with said shafts and an overrunning clutch adapted to connect said driven shaft with the loose wheel thereon.

ALBERT FORSTER.